(12) United States Patent
Abbasi et al.

(10) Patent No.: US 11,801,451 B2
(45) Date of Patent: Oct. 31, 2023

(54) METHOD AND APPARATUS FOR DESALINATING WATER

(71) Applicant: Oregon State University, Corvallis, OR (US)

(72) Inventors: Bahman Abbasi, Bend, OR (US); Xiang Zhang, Bend, OR (US); Mohammed Abbas Elhashimi Khalifa, Corvallis, OR (US); Deepak Sharma, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 17/835,137

(22) Filed: Jun. 8, 2022

(65) Prior Publication Data

US 2022/0362683 A1    Nov. 17, 2022

Related U.S. Application Data

(62) Division of application No. 16/985,020, filed on Aug. 4, 2020, now Pat. No. 11,383,179.

(Continued)

(51) Int. Cl.
| | |
|---|---|
| *B01D 1/30* | (2006.01) |
| *B01D 45/16* | (2006.01) |
| *B01D 5/00* | (2006.01) |
| *B01D 1/00* | (2006.01) |
| *B01D 1/14* | (2006.01) |

(Continued)

(52) U.S. Cl.
CPC .............. *B01D 1/30* (2013.01); *B01D 1/0035* (2013.01); *B01D 1/14* (2013.01); *B01D 1/16* (2013.01); *B01D 5/006* (2013.01); *B01D 45/16* (2013.01); *C02F 1/043* (2013.01); *C02F 1/10* (2013.01); *C02F 1/14* (2013.01); *F04F 5/18* (2013.01);

(Continued)

(58) Field of Classification Search
CPC ........... F04F 5/18; B01D 1/0035; B01D 1/14; B01D 1/16; B01D 1/30; B01D 5/006; B01D 45/16; C02F 1/10; C02F 1/14; C02F 2101/10; C02F 2103/08; C02F 2303/10

See application file for complete search history.

(56) References Cited

U.S. PATENT DOCUMENTS

| | | |
|---|---|---|
| 4,171,243 A | 10/1979 | Brooks et al. |
| 5,360,511 A | 11/1994 | Bayliss et al. |
| 6,699,369 B1 | 3/2004 | Hartman et al. |
| 7,357,849 B2 | 4/2008 | Wright |

(Continued)

*Primary Examiner* — Jonathan Miller
(74) *Attorney, Agent, or Firm* — Klarquist Sparkman, LLP

(57) ABSTRACT

This disclosure concerns a system and a method for removing dissolved solids from liquids. Specific implementations concern desalinating water. The system may comprise a blower, such as a thermal fan/compressor, configured to atomize a solid-bearing liquid to produce a hot, humid gas containing dissolved solids; a gas-solid separator configured to receive hot, humid gas containing entrained dissolved solids from the blower to separate the solids from the humid gas and to transmit the humid gas with solids removed through an exit port; a heater configured to heat the hot, humid gas received from the exit port of the gas-solid separator; and a condenser configured to receive heated humid gas from the heater and to condense solids-free liquid therefrom. The thermal fan/compressor may comprise a plurality of nozzles with outlets positioned adjacent atomization apertures across which a solid-bearing liquid flows and through which gas exiting the nozzles passes.

18 Claims, 12 Drawing Sheets

Related U.S. Application Data

(60) Provisional application No. 62/968,747, filed on Jan. 31, 2020, provisional application No. 62/882,953, filed on Aug. 5, 2019.

(51) Int. Cl.
  *C02F 1/10* (2023.01)
  *C02F 1/14* (2023.01)
  *C02F 1/04* (2023.01)
  *B01D 1/16* (2006.01)
  *F04F 5/18* (2006.01)
  *C02F 101/10* (2006.01)
  *C02F 103/08* (2006.01)

(52) U.S. Cl.
  CPC ...... *C02F 2101/10* (2013.01); *C02F 2103/08* (2013.01); *C02F 2303/10* (2013.01)

(56) References Cited

U.S. PATENT DOCUMENTS

| | | | |
|---|---|---|---|
| 8,273,165 B2* | 9/2012 | Rock | B01D 1/20 |
| | | | 210/512.1 |
| 8,282,772 B2 | 10/2012 | Jepson | |
| 8,906,203 B2* | 12/2014 | Ugolin | B01D 1/18 |
| | | | 203/DIG. 1 |
| 9,546,099 B2* | 1/2017 | Rock | B01D 5/006 |
| 10,508,044 B2 | 12/2019 | Wilson | |
| 2003/0221431 A1* | 12/2003 | Rock | F23R 3/30 |
| | | | 60/737 |
| 2007/0045099 A1 | 3/2007 | Wright | |
| 2011/0108407 A1 | 5/2011 | Jepson | |
| 2011/0139378 A1 | 6/2011 | Lakatos et al. | |
| 2014/0027528 A1* | 1/2014 | Attey | F24F 6/16 |
| | | | 261/30 |
| 2017/0027528 A1 | 2/2017 | Kaleal, III et al. | |
| 2022/0315448 A1* | 10/2022 | Rock | C02F 1/048 |
| 2023/0035924 A1* | 2/2023 | Rock | B01D 61/02 |

* cited by examiner

METHOD AND APPARATUS FOR DESALINATING WATER

CROSS REFERENCE TO RELATED APPLICATION

This application is a divisional of U.S. patent application Ser. No. 16/985,020, filed on Aug. 4, 2020, which claims the benefit of the earlier filing dates of U.S. provisional patent application Nos. 62/882,953, filed on Aug. 5, 2019, and 62/968,747, filed on Jan. 31, 2020, which prior applications are incorporated by reference herein in their entirety.

ACKNOWLEDGMENT OF GOVERNMENT SUPPORT

This invention was made with government support under Award Nos. DE-EE0008402 and DE-AR0001000 by the United States Department of Energy. The government has certain rights in the invention.

FIELD

This disclosure concerns a system and method for its use to purify fluids, such as water, with particular embodiments concerning removing salt and dissolved solids from water to produce fresh water.

BACKGROUND

Water treatment facilities are critical infrastructure that are increasingly unable to meet demand due to a combination of deferred maintenance, age, population growth, overuse, and increasing frequency and intensity of droughts that contribute to water scarcity. Desalination is a possible solution to improve water supplies for domestic, agricultural, and industrial uses, in any area where water with high total dissolved solids (TDS) is available, including seawater, agricultural run-off, and water generated from oil and gas wells.

Membrane-based processes are mostly efficient and are widely employed to desalinate seawater. However, they are plagued by high operating costs, membrane fouling, and high electricity consumption. As the salinity of the feed water increases, these issues are exacerbated. In addition, membrane-based processes inherently cannot be the basis for zero liquid discharge (ZLD) systems, i.e. systems in which no waste liquid is purified and recovered. Some thermal processes, such as humidification-dehumidification (HDH) and adsorption-desalination, utilize a packed bed of material. The packed bed method, though suitable for ZLD, fouls when purifying high salinity water.

The most common methods that are used to reduce specific energy consumption (SEC) and levelized cost of water (LCOW) are increasing the size of the plants and performing desalination in multiple stages. These approaches have three major drawbacks:

1. Large desalination plants require exorbitant capital cost, erect entry barriers and restrict innovation, and are unfeasible in small or geographically-dispersed communities;

2. Repeating the same desalination process in multiple stages can reduce energy consumption of a single process, but does not provide a comprehensive and methodical way to minimize LCOW and SEC; and 3. Most commercial-scale desalination technologies are not zero liquid discharge (ZLD) process, so they foul and generate a concentrated brine waste stream that must be managed.

Therefore, there remains a need for ZLD technologies that can adequately remove TDS from water efficiently while reducing fouling and without the need for large capital costs or proximity to utility infrastructure.

SUMMARY

Disclosed embodiments of the present invention provide an improved fluid purification system and process, particularly water desalination technology, that reduce the cost of desalination, reduce energy consumption, and improve efficiency. Certain embodiments are portable, can be used for remote areas or difficult to access water sources, have low energy requirements, and have low capital cost.

A modeling tool was developed that was equipped with an energy consumption database for common desalination processes, including RO, humidification-dehumidification (HDH), multi-effect distillation (MED), thermal vapor compression (TVC), capacitive ionization (CDI), and electrodialysis (ED). Each process is a separate module. Any number of modules can be connected in any desired configuration to design new hybrid schemes and assess their effectiveness and energy efficiency as compared to the technology described herein.

One disclosed embodiment concerns a process for treating highly saline and/or high TDS water with zero liquid discharge (ZLD). The technology is modular, light-weight, highly portable and scalable, and can be used to process fluids having a solids content up to the saturation point of the solid in the fluid under the thermodynamic conditions, including temperature and pressure, extant. For example, certain embodiments are useful for processing saline water with up to 450,000 ppm TDS, but more typically are used to process saline water with 100,000 ppm TDS or less. Energy consumption and cost is competitive with large reverse osmosis ("RO") desalination plants at a small fraction of the capital cost. This is accomplished using flowing gas to atomize highly saline and/or high TDS water. Gas flow may be supplied in many ways, e.g. from a conventional electric blower or from thermally-actuated fans/compressors, that may be, for example, heated with low-grade heat, including solar heat. In particular embodiments, thermally-actuated nozzles are preferred because they do not require electricity and may enable a more energy-efficient process. Hot air jets are humidified in a thermal fan/compressor or thermal blower and carry solid particles to a cyclonic separator. The salt-free humid air stream enters a condenser to recoup the heat and condense the water. Freshwater is recovered and the cycle repeats.

Disclosed desalination process embodiments are based on thermal vapor compression and humidification-dehumidification (TVC-HDH). For certain embodiments, the packed bed commonly used in HDH may be replaced with a highly innovative and advanced thermal fan/compressor that may combine the functions of a heat recuperator, a dry or low-humidity air blower, and a water condenser. A person of ordinary skill in the art will appreciate that the component can be made using any suitable material, or combinations of materials, including a metal or metals, a metal alloy or alloys, a polymer or polymers, or combinations thereof. Certain embodiments of the component may be made from materials such as stainless steel, carbon steel, copper-bronze, brass, titanium, nickel, PP, PVC-C, PVDF, Teflon PFA, PEEK, or gauze made from a polypropylene/polyacrylonitrile mixture (PP/PAN). Electric air blowers and high-pressure water sprays are eliminated, which greatly reduces electricity consumption. FIGS. 2 and 3 illustrate a typical HDH process and the proposed hybrid ZLD desalination process, respectively.

Certain disclosed aspects of the invention concern a thermal fan/compressor device to atomize liquids having dissolved solid content. In specific disclosed embodiments, the thermal fan/compressor includes an inlet face, an outlet face, a wall, and a plurality of nozzles arranged in a chamber formed by the inlet and outlet faces and the wall. The inlet face typically includes at least one, and potentially plural inlet ports, to admit gas to a nozzle or a plurality of nozzles. Each nozzle has an inlet end connected to the inlet face of the thermal fan/compressor, the inlet end serving to admit gas to the nozzle through an inlet orifice. The nozzles have an outlet end that defines an outlet orifice which typically is smaller in diameter than the inlet orifice. The nozzles may include a heat exchanger to heat gas contained within the nozzles. This heating causes gas to accelerate towards the outlet end of the nozzle, which produces a directed flow of air towards the outlet face of the thermal fan/compressor. The outlet face of the thermal fan/compressor typically includes a number of atomization apertures across which liquid containing dissolved solids can flow and through which moving gas from the nozzles passes to atomize the liquid. This produces a hot, humid gas having entrained solid particles.

Other disclosed aspects of the invention concern a system to accomplish fluid purification, such as water desalination. In certain embodiments, the system includes a thermal fan/compressor, a separator, a heat source, and a condenser. The thermal fan/compressor accelerates air and thereby atomizes liquid containing dissolved solids (such as saline water), producing a hot, humid gas with entrained solids. In certain embodiments, a gas-solid separator (e.g. a cyclonic separator) is used to remove the entrained solids from the hot, humid gas. Removed solids may be collected by a solids collector, which may additionally serve as a heat recuperator that transmits heat from the collected solids to a liquid inflow containing dissolved solids. In some embodiments, the humid air with entrained solids removed may be further heated by a heat source, such as a solar heater. In some embodiments a liquid having a greatly reduced TDS content, and perhaps a substantially solid-free liquid, may be condensed from the hot, humid air. The condensation surfaces on which this condensation occurs may also be the external surface of the nozzles within the thermal fan/compressor. Heat transferred to the nozzles during condensation may be supplied to the air within the nozzles. In some embodiments, condensed, substantially solid-free liquid is thereafter collected from the system. Air from which the substantially solid-free liquid has been condensed may be reintroduced to the thermal fan/compressor through the inlet face.

In certain embodiments, the gas may be air, which may at various portions of the apparatus also be dry. At various portions of the apparatus, the air may have a first velocity approaching 0 m/s. At other portions of the apparatus, the air may have a second velocity greater than the first. In certain embodiments, the liquid having dissolved solids therein may be saline water, and the liquid which has had solids separated out may be fresh water.

Yet another disclosed aspect of the invention concerns an alternative device to accomplish the hybrid desalination process. In certain embodiments, the device includes a thermal fan/compressor, a condenser, a gas-solid separator, a heat source, and a gas-liquid separator. In certain embodiments, a heat source, such as a solar heater, is used to heat the nozzles in the thermal fan/compressor. Heating the thermal fan/compressor nozzles accelerates air and atomizes liquid containing dissolved solids (such as saline water) to produce a hot, humid gas with entrained solids. Additional heat may be transmitted to the hot, humid gas with entrained solids by a condenser, which supplies evaporation heat to the hot, humid gas. A gas-solid separator (e.g. a cyclonic separator) may be used to remove the entrained solids from the hot, humid gas. The entrained solids are collected and the hot, humid gas with solids removed exits the gas-solid separator. In certain embodiments, a condenser condenses a substantially solid-free liquid from the hot, humid gas leaving the gas-solid separator, yielding a mixture of solid free gas and liquid. This condenser may be the same condenser that supplies evaporation heat to the hot, humid gas with entrained solids leaving the thermal fan/compressor. A gas-liquid separator may be used to separate the substantially solid free gas from the solid free liquid. The separated gas may be re-introduced to the thermal fan/compressor chamber through the inlet face thereof.

In certain embodiments, the system may include a solids collector in communication with the gas-solid separator. The solids collector may be configured to receive solids rejected from the hot humid gas by the separator.

In certain embodiments, the system further includes a heat recuperator. The heat recuperator may be configured to remove heat from the substantially solids-free liquid leaving the gas-liquid separator and transmit that heat to an incoming flow of solids-bearing liquid.

In certain embodiments, the system may further include a bleed stream that further heats the substantially solids-free liquid leaving the gas-liquid separator with bleed enthalpy from the hot, humid gas leaving the gas-solid separator.

In certain embodiments, the system may further include an auxiliary heater, which supplies additional heat to humid air at the condenser inlet. This promotes heat exchange by providing a sufficient temperature gradient to evaporate liquid droplets on the evaporator side as well as raising the temperature beyond the saturation point at the evaporator outlet.

Other disclosed aspects of the invention concern a method for using disclosed embodiments of a desalination system. The method may involve, for example, supplying a flow of gas to a thermal fan/compressor. Nozzles of the thermal fan/compressor are heated thereby, causing the dry gas to accelerate and flow out of the outlet orifices of the nozzles. Airflow through nozzle outlet orifices is then directed through atomization apertures of the outlet face of the thermal fan/compressor, thereby atomizing a solid-bearing liquid and forming hot, humid gas with entrained solids. The flow of hot, humid gas is then supplied to a gas-solid separator (e.g. a cyclonic separator) wherein the entrained solids are separated from the hot, humid gas with entrained solids. In certain embodiments, these solids are gathered in a solids collector. The solids collector may additionally serve as a heat recuperator that transmits heat from the collected solids to a liquid inflow containing dissolved solids. The method may further involve supplying the flow of hot, humid gas from the gas-solid separator to a heater (e.g. a solar heater), to further heat the gas. The method also may further involve supplying the flow of hot, humid gas to a condenser wherein a substantially solid-free liquid is removed from the gas by condensation. In some embodiments, the condensation surfaces may be the nozzles within the thermal fan/compressor, and heat from the hot, humid air that contacts such nozzles can be transferred to air within the nozzles. Optionally, the gas from the substantially solid-free liquid may be re-introduced to the thermal fan/compressor chamber through the inlet face thereof.

Other disclosed aspects of the invention concern a method for using an alternative desalination device. A flow of dry gas is supplied to a thermal fan/compressor according to the embodiments previously discussed. The method further involves heating the nozzles of the thermal fan/compressor, thereby causing the air to accelerate and flow out of the outlet orifices of the nozzles. Heat may be supplied to the nozzles of the thermal fan/compressor by a heat source, such as a solar heater. Airflow through nozzle outlet orifices is directed through atomization apertures of the outlet face of the thermal fan/compressor, thereby atomizing the solid-bearing liquid and forming hot, humid gas with entrained solids. The hot, humid gas may be heated further by condensation heat from a condenser. In certain embodiments, the method can further involve supplying the flow of hot, humid gas with entrained solids to a gas-solid separator (e.g. a cyclonic separator) wherein the entrained solids are separated from the hot, humid gas. The hot, humid gas flow from the gas-solid separator is then supplied to a condenser, wherein a substantially solid-free liquid is removed from the gas by condensation. Condensation heat generated thereby may be supplied to the hot, humid gas with entrained solids leaving the thermal fan/compressor. The mixture of gas and substantially solid free liquid is supplied to a gas-liquid separator to separate the gas from the substantially solid free liquid.

In certain alternative embodiments, the substantially solid free liquid from the gas-liquid separator may be further supplied to a heat recuperator which retains at least some of the heat from the substantially solid free liquid. Heat retained by the recuperator may be further communicated to the supply of solid-bearing liquid to the outlet face of the thermal fan/compressor.

The foregoing and other objects, features, and advantages of the invention will become more apparent from the following detailed description, which proceeds with reference to the accompanying figures.

DETAILED DESCRIPTION

Figure 1:
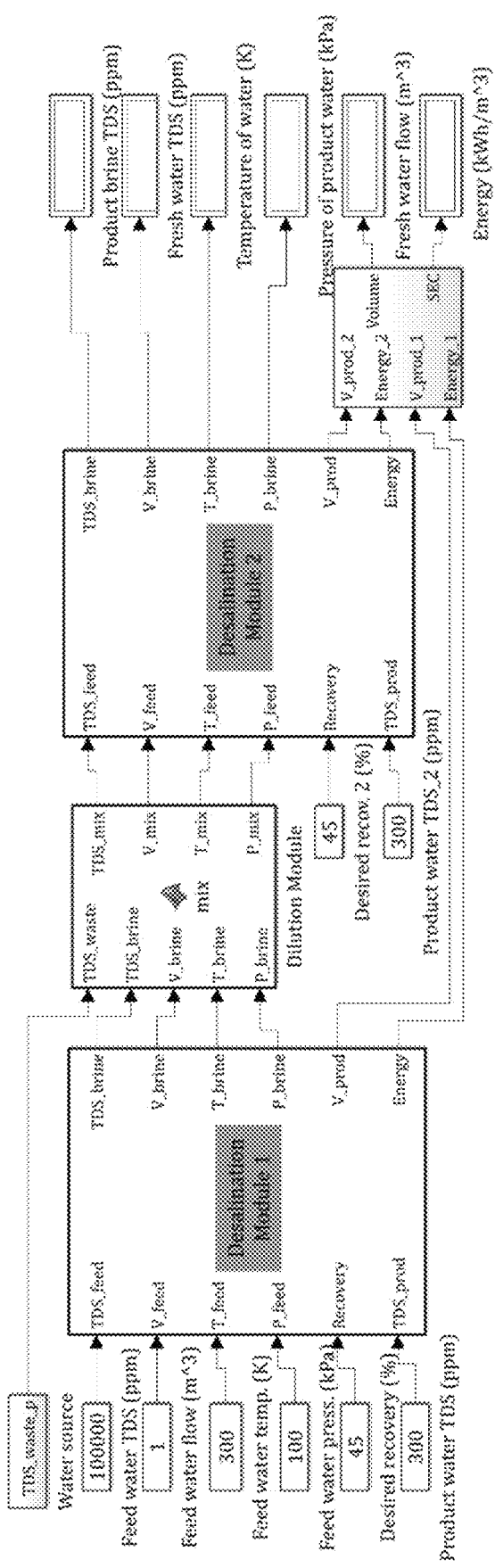
FIG. 1 is an exemplary simulation platform that allows multiple desalination modules to be connected in any desired configuration.

The following detailed description is provided with reference to the drawings and embodiments described herein. The drawings are illustrative and are not intended to limit the scope of the disclosure. It should further be understood that the term "desalination" as used herein refers to the removal of salt and other total dissolved solids (TDS) from any fluid source, particularly a water source contaminated with such solids. TDS refers to any material that may be dissolved in a fluid, particularly water, and includes by way of example dissolved salts, ionic compounds, minerals, metals or other materials dissolved in water.

I. DEFINITIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges refers to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Certain disclosed embodiments concern processing fluids, particularly water, to produce a "substantially solid free" fluid. "Substantially solid free" will be understood by a person of ordinary skill in the art to depend upon the fluid, the solids content, and the purpose for which the fluid is used. "Substantially solid free" refers to a fluid having a reduced solids content after processing according to disclosed embodiments relative to the same fluid prior to processing, and such processing to produce a reduced solids content provides a processed fluid having an improved property or benefit relative to the fluid prior to processing. For disclosed embodiments directed to desalinating water to produce potable water, "substantially solid free" means water having a salt concentration after processing according to disclosed embodiments approaching 0 ppm, more typically greater than 0 ppm to 1,000 ppm, and preferably equal to or less than 500 ppm, such as 100 to 500 ppm or less.

II. INTRODUCTION

FIG. 1 schematically illustrates a modeling tool developed to evaluate disclosed embodiments and to allow comparisons to other technologies. The model is equipped with an energy consumption database for common desalination processes, including RO, humidification-dehumidification (HDH), multi-effect distillation (MED), thermal vapor compression (TVC), capacitive ionization (CDI), and electrodialysis (ED). Each process is in the form of a separate module. Any number of modules can be connected in any desired configuration to design new systems and methods for their use and assess their effectiveness and energy efficiency as compared to the technology described herein.

Figure 2:
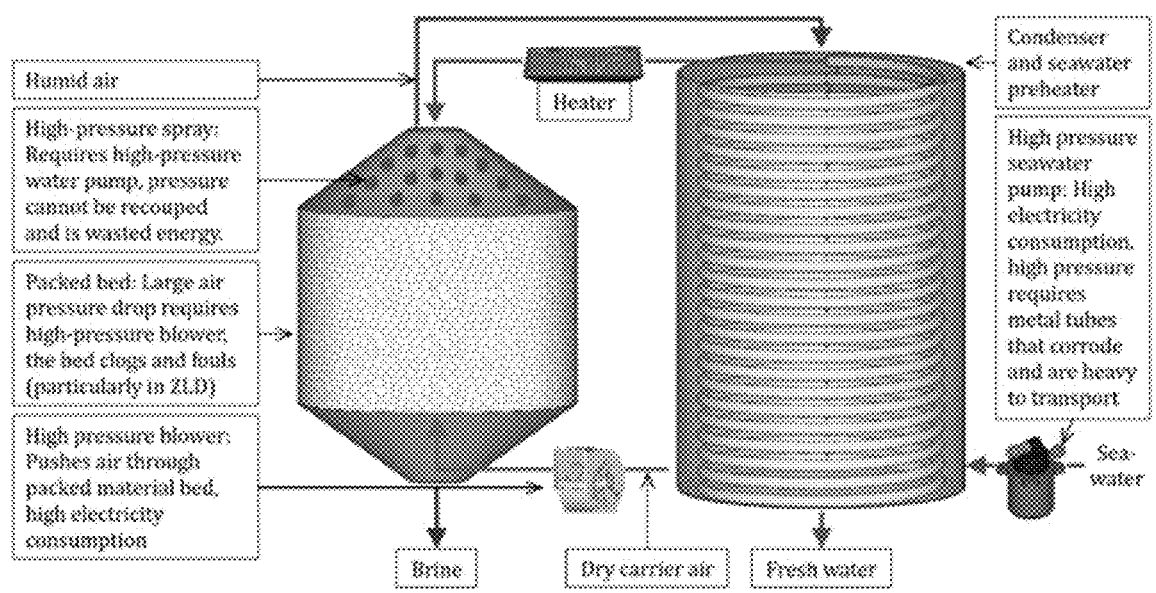
FIG. 2 is a schematic drawing of a conventional humidification-dehumidification (HDH) desalination with heat recovery, as is known in the art.

FIG. 2 illustrates an example of a conventional HDH process with heat recovery.

III. FLUID PURIFICATION SYSTEM

Described herein are embodiments of a system for the energy-efficient purification of fluids, with particular embodiments concerning desalination of water. Also disclosed herein are embodiments of a method for using the disclosed system.

Figure 3:
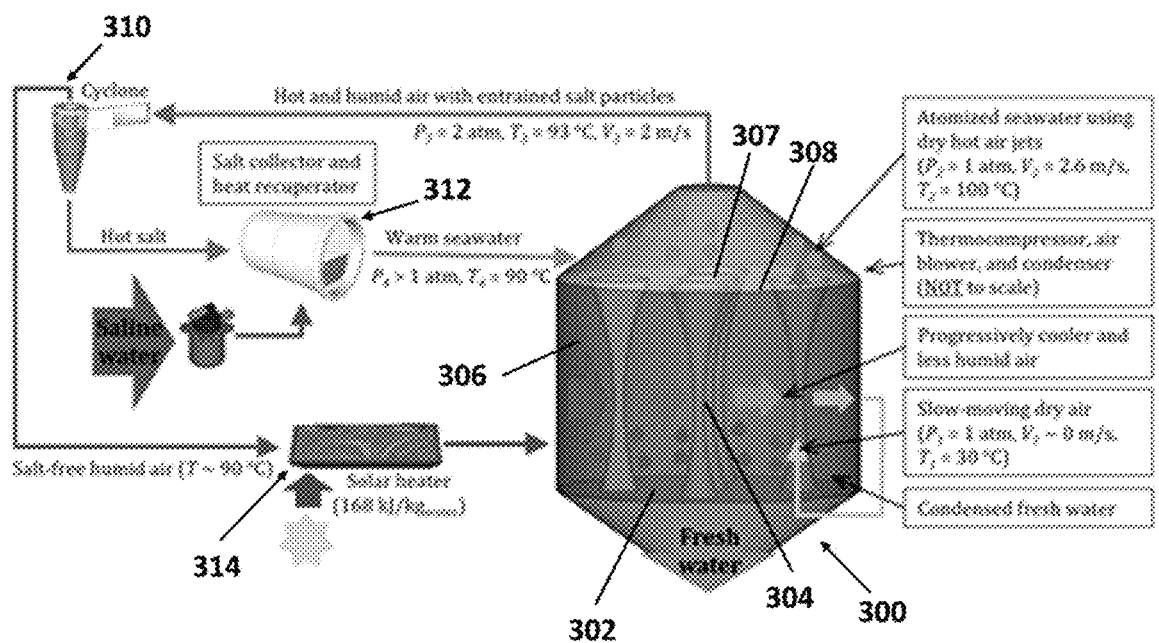
FIG. 3 is a schematic of an exemplary embodiment of a system in accordance with the present disclosure.
Figure 9:
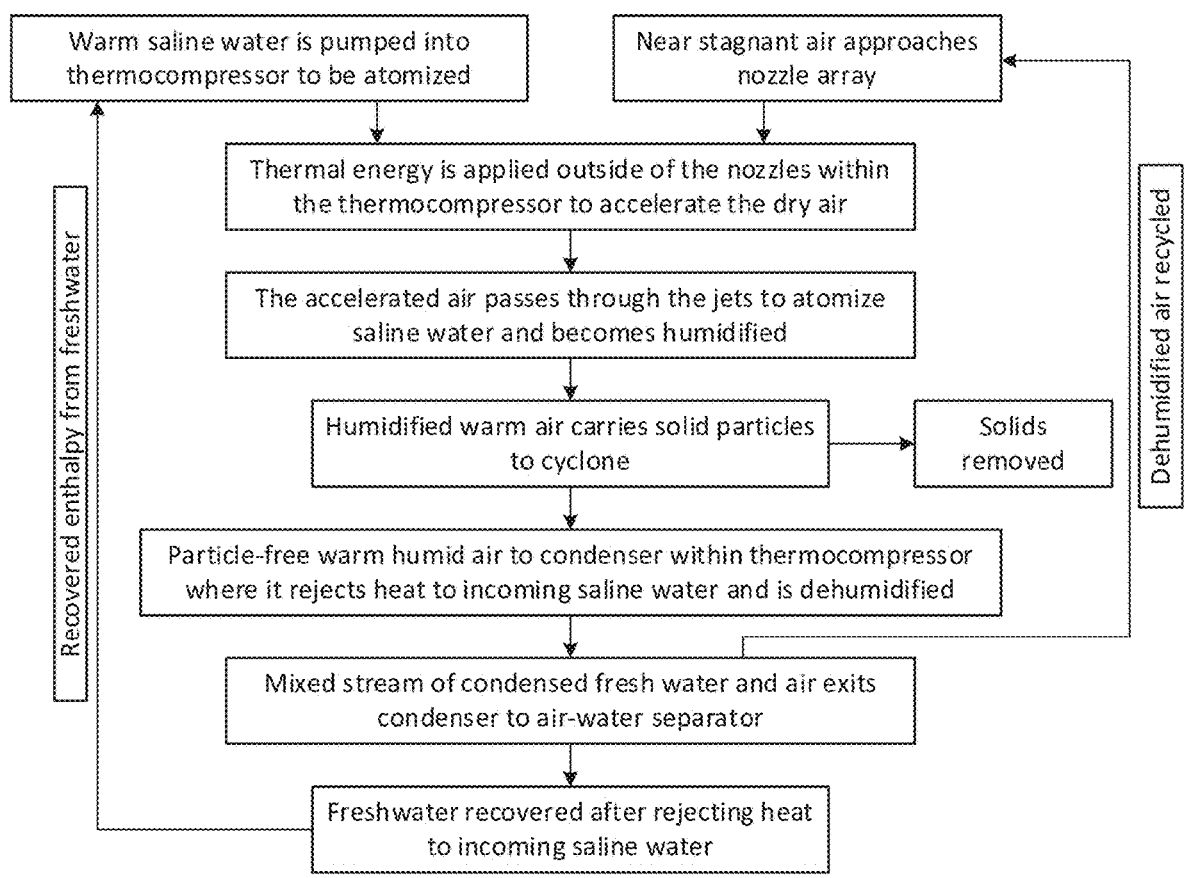
FIG. 9 is flowchart illustrating a desalination process in accordance with one embodiment of the present disclosure illustrated in FIG. 3.

FIG. 3 illustrates one exemplary embodiment of a system in accordance with the present disclosure. Dry air at a first velocity approaching 0 m/s enters thermal fan/compressor 300 through inlet face 302. Air accelerates within thermal fan/compressor 300 to a second velocity greater than the first velocity through nozzles 304 as warm, salt-free humid air inside the condensation and heat exchange chamber 306 contacts the nozzles. The accelerated air passes through openings 307 in the outlet face 308 of the thermal fan/compressor and atomizes a stream of warm saline water (e.g., sea water) to increase the relative humidity and entrain solid particles in the air flow. The hot, humid, salty air enters a cyclone 310 where solid particles, such as solid salt particles, are removed and substantially solid-free warm air exits to be recycled back to the thermal fan/compressor 300. The solid waste stream is recovered in a solids collector 312. Solids collector 312 may also operate as a heat recuperator to increase the temperature of inbound water, such as saline water, that is pumped to the thermal fan/compressor 300 and flows across the outlet face 308. The salt-free, hot, humid air exiting the cyclone 310 may be further heated by a heater, such as solar heater 314. The salt-free, hot, humid air enters the heat exchange and condensation chamber 306 of thermal fan/compressor 300. Water vapor condenses to provide substantially desalinated (fresh) water as the air stream cools within the condensation chamber 306, collecting on the outside of the nozzles 304 for use. A similar embodiment is further illustrated in the flowchart shown in FIG. 9.

Figure 4:
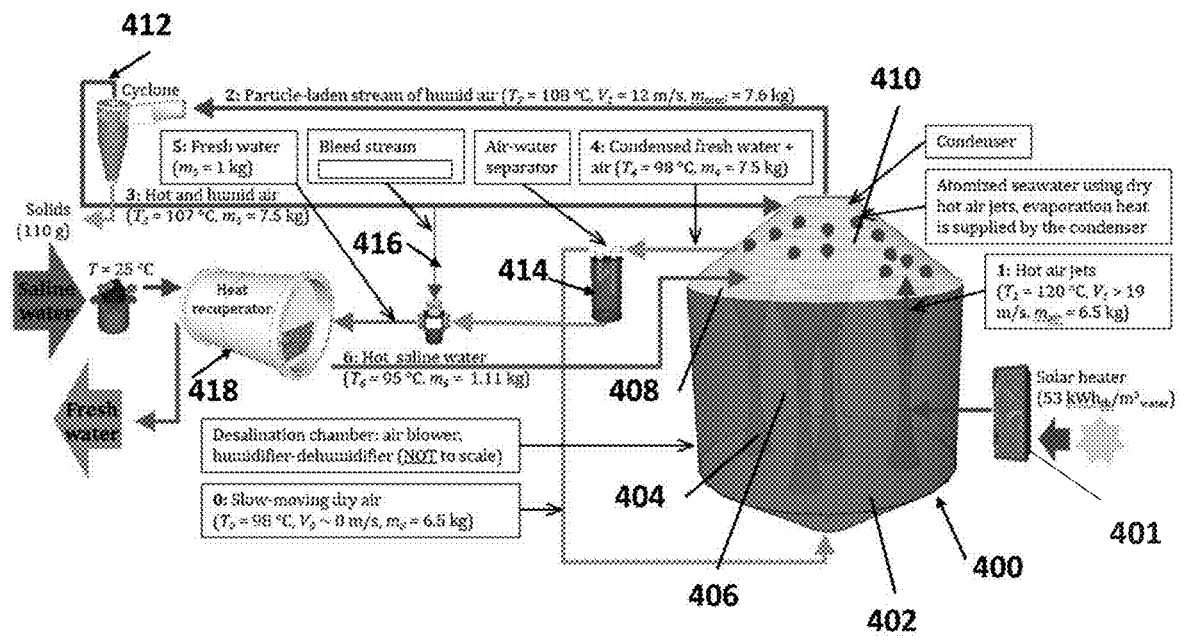
FIG. 4 is a schematic of an exemplary embodiment of a system in accordance with the present disclosure.
Figure 10:
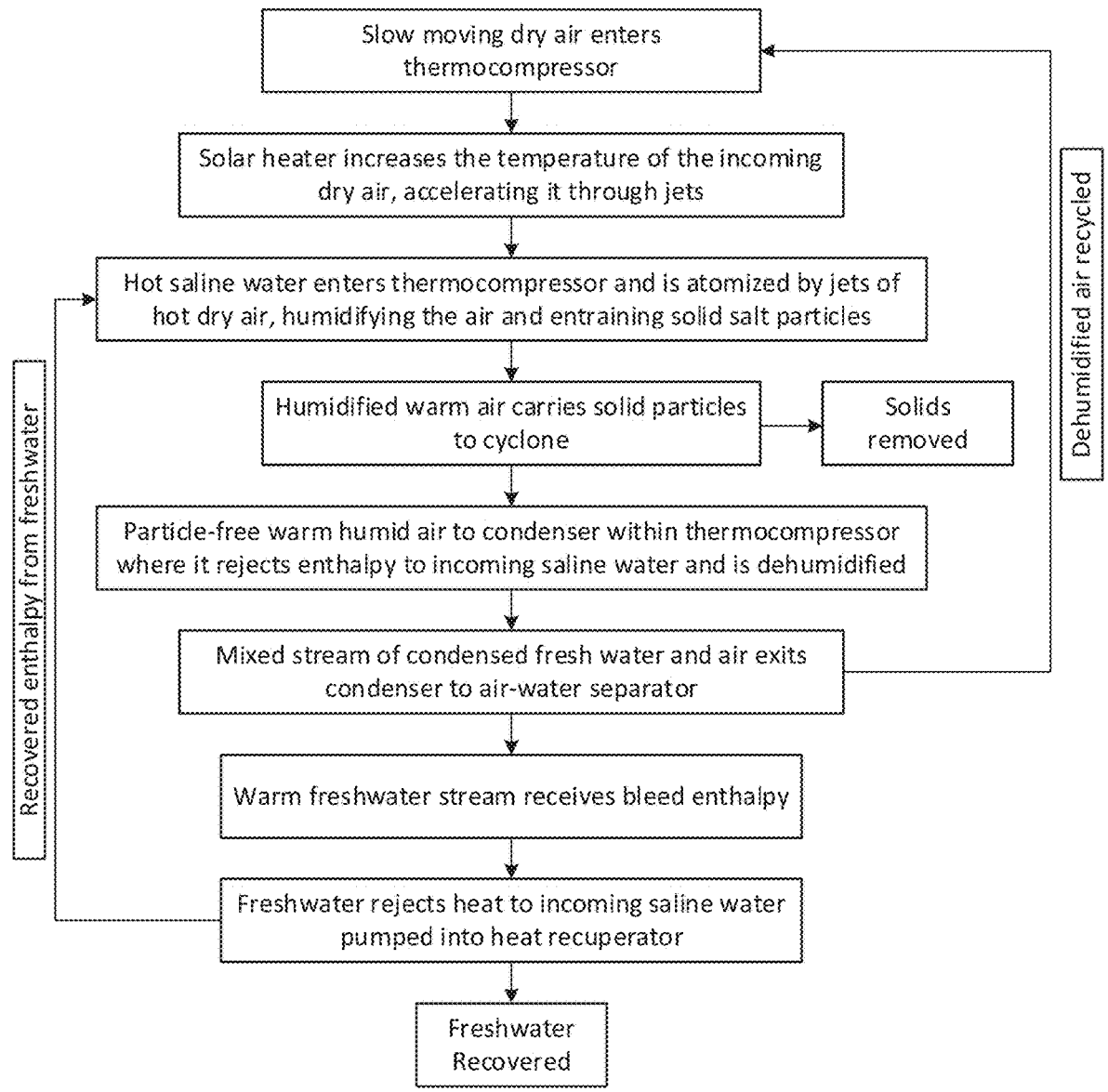
FIG. 10 is a flowchart illustrating a desalination process in accordance with another embodiment of the present disclosure, illustrated in FIG. 4.

FIG. 4 illustrates another exemplary embodiment of a desalination system in accordance with the present disclosure. In this embodiment, solar thermal energy, as may be supplied by solar heater 401, heats dry air, having a first velocity approaching 0 m/s, as it enters thermal fan/compressor 400 through inlet face 402. Thermal fan/compressor 400 has a plurality of nozzles 404 within a condensation chamber 406. The air is accelerated through nozzles 404 and passes through outlet face 408, encountering hot fluid with dissolved materials, such as saline water. The fluid is vaporized by the accelerated hot air. Additional heat may be provided by a closed-loop condenser 410 within thermal fan/compressor 400. Humid hot air leaves thermal fan/compressor 400 with entrained solids. The particle-laden, hot humid air enters a cyclone 412 where the particles are removed, and substantially salt-free warm air exits to be recycled back to thermal fan/compressor 400. In certain embodiments, trace amounts of solids may not be recovered in the cyclone, and may be included in the warm humid air. The particle-free or substantially particle-free warm humid air returns to condenser 410 where substantially solids-free (fresh) water condenses and the mixture of condensed water and air is directed to air-water separator 414. Air-water separator 414 removes water from the air leaving the condenser 410. Air is recycled to thermal fan/compressor 400, while the warm fresh water receives additional heat from an enthalpy bleed stream 416 from the hot, humid, particle-free air on its way to condenser 410. A person of ordinary skill in the art will appreciate that the enthalpy bleed may vary, such as from 0% to 20%. The warm fresh water passes into a heat recuperator 418 to increase the temperature of inbound saline water that is pumped into heat recuperator 418. This embodiment is also illustrated in the flowchart shown in FIG. 10.

Figure 5:
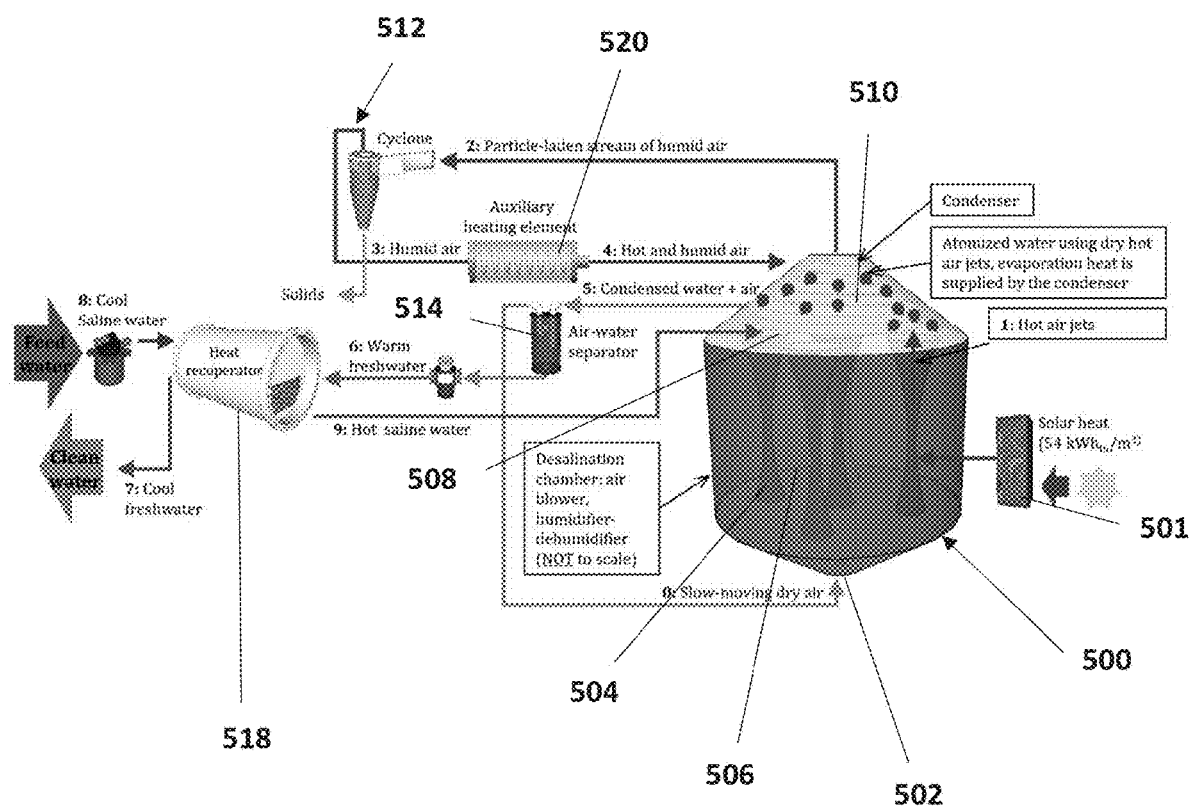
FIG. 5 is a schematic of an exemplary embodiment of a system in accordance with the present disclosure.

FIG. 5 illustrates an exemplary embodiment of a desalination system in accordance with the present disclosure. In this embodiment, solar thermal energy, such as from solar heater 501, heats dry air, having a first velocity approaching 0 m/s, as it enters thermal fan/compressor 500 through inlet face 502. Thermal fan/compressor 500 has a plurality of nozzles 504 within a condensation chamber 506. The air is accelerated through nozzles 504 and passes through outlet face 508, encountering hot fluid with dissolved materials, such as saline water. The fluid is vaporized by the accelerated hot air, and additional heat is provided by a closed-loop condenser 510 within thermal fan/compressor 500. Humid hot air leaves thermal fan/compressor 500 with entrained solids. The particle-laden, hot humid air enters a cyclone 512 where the particles are removed. Salt-free warm air exits the cyclone 512, passes to an auxiliary heating element 520 to be recycled back to thermal fan/compressor 500. Fluid flow through the intermediate stages between the evaporator outlet 508 and the condenser inlet 502 experiences a pressure drop. This pressure drop reduces the fluid flow temperature. A lower fluid flow temperature reduces the temperature gradient in the condenser/evaporator and leads to less effective heat recuperation. To compensate, the embodiment of FIG. 5 includes auxiliary heating element 520, which supplies additional heat to the humid air at the condenser inlet. This promotes heat exchange by providing a sufficient temperature gradient to evaporate liquid droplets on the evaporator side as well as raising the temperature beyond the saturation point at the evaporator outlet. A fraction of hot air generated at the thermal fan/compressor section can be diverted to auxiliary heater 520 to supply the required energy. FIG. 5 illustrates positioning auxiliary heater 520 in the fluid line from cyclone 512 back to condenser 510. However, auxiliary heater 520 also could be positioned in the fluid feed line from the thermal fan/compressor 500 to cyclone 512. The embodiment of FIG. 5 can reach over 80° C. at condenser inlet 502 without exceeding total process energy targets. Particle-free, warm humid air returns to the condenser 510 where fresh water condenses. The mixture of condensed water and air is directed to air-water separator 514, which removes water from the air leaving the condenser 510. Air is recycled to thermal fan/compressor 500. Warm fresh water passes into a heat recuperator 518 to increase the temperature of inbound saline water that is pumped into heat recuperator 518.

Figure 11:
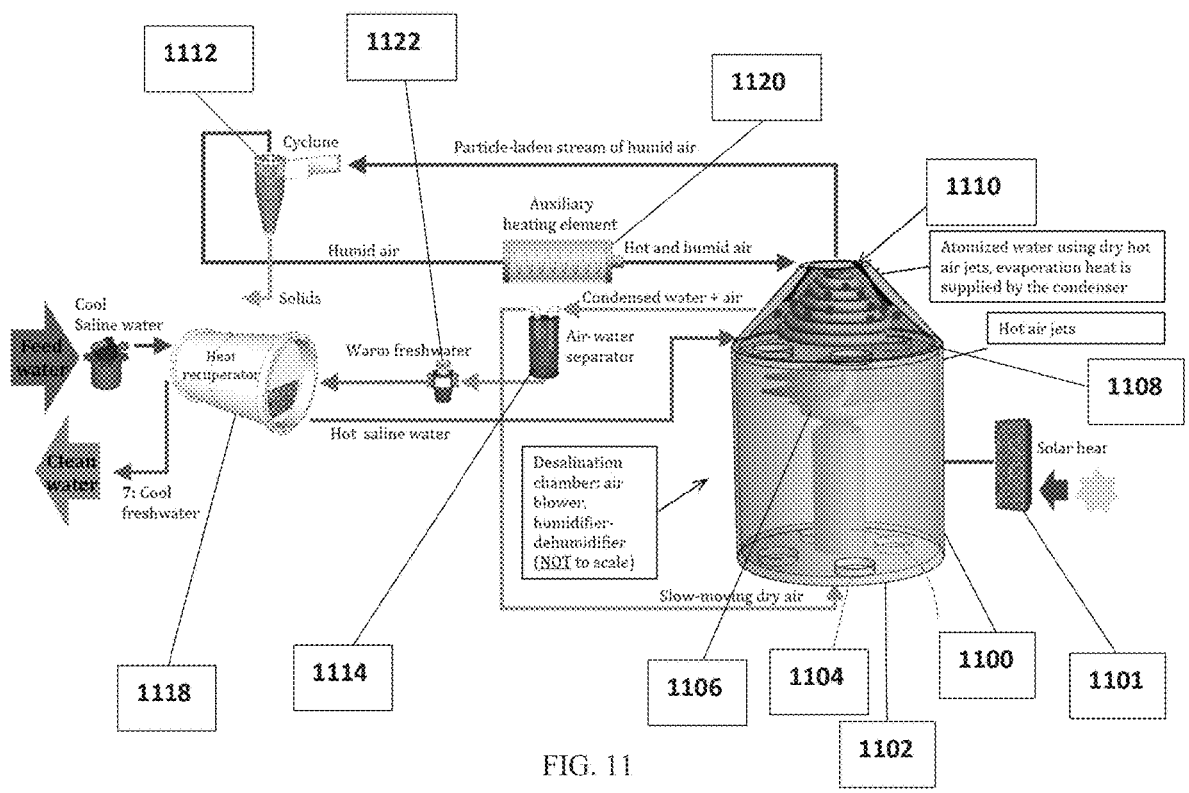
FIG. 11 is a schematic of an exemplary embodiment of a system in accordance with the present disclosure.

Each of the exemplary systems discussed above include a thermal fan/compressor, such as thermal fan/compressors 300, 400 and 500. However, a thermal fan/compressor is not a required component, and instead can be replaced with a component that provides substantially the same function, such as desalination chamber 1100 that includes an air blower and a humidifier-dehumidifier as illustrated by FIG. 11. In this embodiment, thermal energy, such as may be supplied by solar heater 1101, heats dry air, having a first velocity approaching 0 m/s, as it enters desalination chamber 1100 at inlet face 1102 through inlet apertures 1104. Desalination chamber 1100 houses blower 1106, which accelerates and heats air to pass through outlet face 1108, where it encounters fluid with dissolved materials, such as saline water. The fluid is vaporized by the accelerated hot air. Additional heat may be provided by a closed-loop condenser 1110. Humid hot air leaves desalination chamber 1100 with entrained solids. The particle-laden, hot humid air enters a cyclone 1112 where the particles are removed, and substantially salt-free warm air exits to be recycled back to desalination chamber 1100. In certain embodiments, trace amounts of solids may not be recovered in the cyclone, and may be included in the warm humid air. The embodiment of FIG. 5 includes auxiliary heating element 1120, which supplies additional heat to the humid air at the condenser inlet. This promotes heat exchange by providing a sufficient temperature gradient to evaporate liquid droplets on the evaporator side as well as raising the temperature beyond the saturation point at the evaporator outlet. A fraction of hot air generated at the desalination chamber 1100 can be diverted to auxiliary heater 1120 to supply the required energy. FIG. 5 illustrates positioning auxiliary heater 1120 in the fluid line from cyclone 1112 back to condenser 1110. However, auxiliary heater 1120 also could be positioned in the fluid feed line from the desalination chamber 1100 to cyclone 1112, as discussed below with reference to FIG. 12. Particle-free or substantially particle-free warm humid air returns to condenser 1110 where substantially solids-free (fresh) water condenses and the mixture of condensed water and air is directed to air-water separator 1114. Air-water separator 1114 removes water from the air leaving the condenser 1110. Air is recycled to inlet apertures 1104 of desalination chamber 1100. Warm fresh water passes into a heat recuperator 1118 to increase the temperature of inbound saline water that is pumped into heat recuperator 1118. The system of FIG. 11 also includes valve 1122, such as T-valve. Valve 1122 provides additional flexibility to introduce supplemental heat, such as may be provided by a bleed stream from auxiliary heater 1120, into the fluid stream feeding to heat recuperator 1118.

Figure 12:
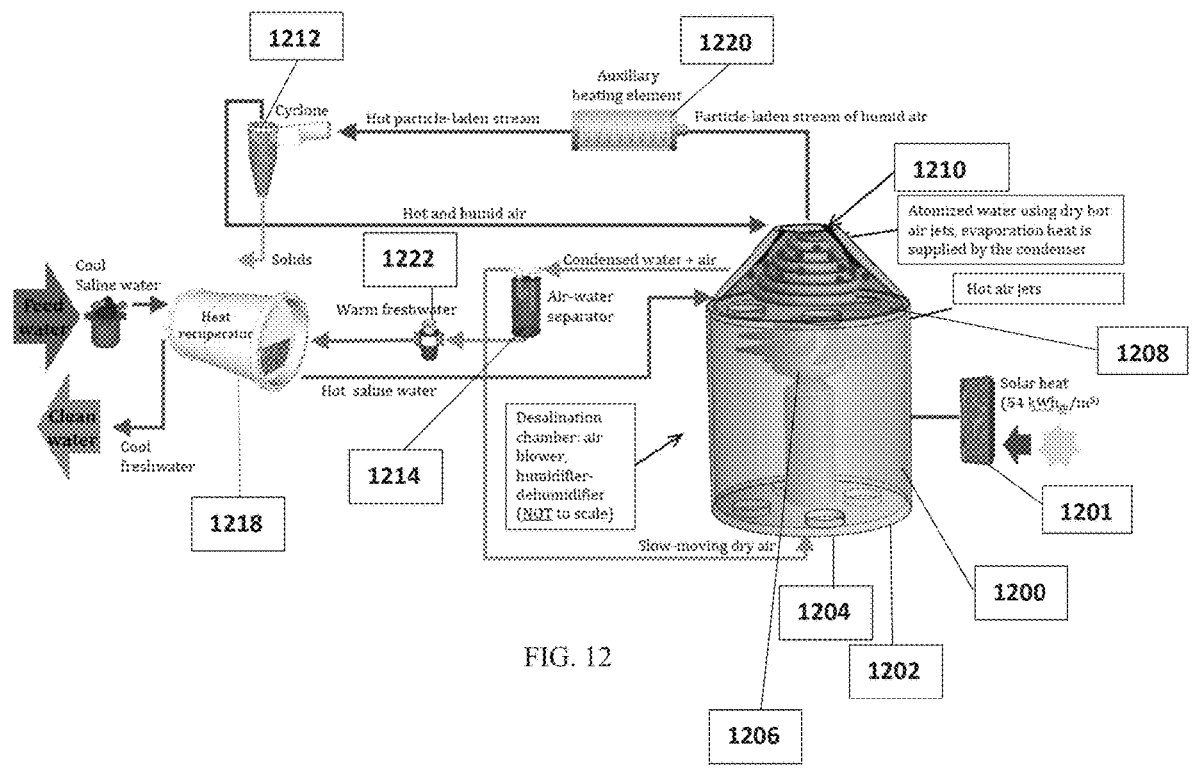
FIG. 12 is a schematic of an exemplary embodiment of a system in accordance with the present disclosure.

FIG. 12 provides an embodiment similar to the exemplary embodiment of FIG. 11. Thermal energy, such as may be supplied by solar heater 1201, heats dry air, having a first velocity approaching but greater than 0 m/s, as it enters desalination chamber 1200 at inlet face 1202 through inlet apertures 1204. Desalination chamber 1200 houses blower 1206, which accelerates and heats air to pass through outlet face 1208, where it encounters fluid with dissolved materials, such as saline water. The fluid is vaporized by the accelerated hot air. Additional heat may be provided by a closed-loop condenser 1210. Humid hot air leaves desalination chamber 1200 with entrained solids. In system embodiment illustrated by FIG. 11, the particle-laden, hot humid air enters a cyclone 1112. For the embodiment of FIG. 12, auxiliary heater 1220 is placed in line between condenser 1210 and cyclone 1212. Auxiliary heating element 1220 supplies additional heat to the humid air flow. A fraction of hot air generated at desalination chamber 1200 can be diverted to auxiliary heater 1220 to supply the required energy. Particles are removed at cyclone 1212, and substantially salt-free warm air exits to be recycled back to desalination chamber 1200. In certain embodiments, trace amounts of solids may not be recovered in the cyclone, and may be included in the warm humid air. Particle-free or substantially particle-free warm humid air returns to condenser 1210 where substantially solids-free (fresh) water condenses and the mixture of condensed water and air is directed to air-water separator 1214. Air-water separator 1214 removes water from the air leaving the condenser 1210. Air is recycled to inlet apertures 1204 of desalination chamber 1200. Warm fresh water passes into a heat recuperator 1218 to increase the temperature of inbound saline water that is pumped into heat recuperator. The system of FIG. 12 also includes valve 1222, such as T-valve. Valve 1222 provides additional flexibility to introduce supplemental heat, such as may be provided by a bleed stream from auxiliary heater 1220, into the fluid stream feeding to heat recuperator 1218.

Each of the exemplary systems discussed above includes a cyclone, such as cyclones 310, 412, 512 and 1112. However, in each such disclosed exemplary system, the cyclone could be replaced with a packed bed component. The packed bed would include a sorbent or combinations of sorbents suitable for separating solids from fluids to produce a fluid with a reduced solids content, such as a substantially solids-free fluid.

IV. EMBODIMENTS OF THERMAL NOZZLES AND FANS

Described herein are examples of thermal fan/compressors suitable for use in the fluid purification system and method embodiments disclosed herein, such as a water desalination system and process. The present disclosure also provides thermal fan/compressor nozzles for use in the thermal fan/compressors. Additional features of exemplary thermal fan/compressor embodiments are disclosed by assignee's U.S. provisional patent application No. 62/968,747, filed on Jan. 31, 2020, and entitled Thermal Fan Apparatus and Method of Use. U.S. provisional patent application No. 62/968,747 is incorporated herein by reference in its entirety.

Figure 6:
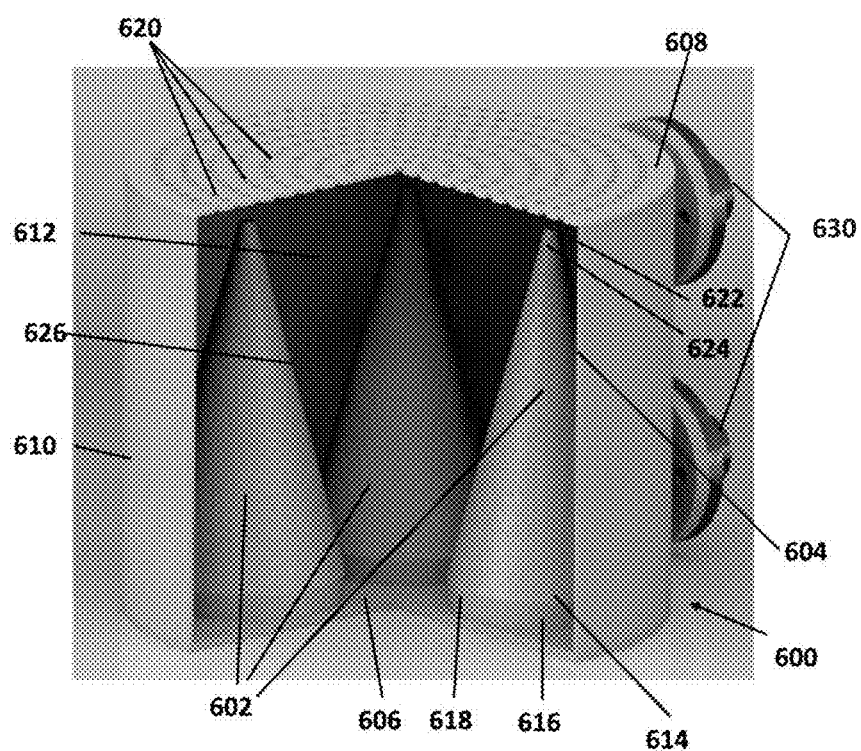
FIG. 6 is a cross sectional view illustrating exemplary thermal nozzles and thermal fan/compressor.

FIG. 6 shows an exemplary thermal fan/compressor nozzle 602 incorporated in a thermal fan/compressor 600. The thermal fan/compressor nozzle 602 has an inlet end 618, an outlet end 624, and an external wall 626. The inlet end 618 and outlet end 624 can have inlet orifice 614 and outlet orifice 622, respectively. Thermal fan/compressor nozzles 602 can be conical or otherwise tapered such that the diameter of the inlet end 618 is greater than the diameter of the outflow end 624, and the diameter of inlet orifice 614 is greater than the diameter of outlet orifice 622. This causes air to pass through the nozzle 602 and ensures that the velocity of air at the outlet, $v_1$, is greater than the velocity of the air at the inlet, $v_0$. The external wall 626 of a thermal fan/compressor nozzle 602 can, in some embodiments, serve as a heat exchange element to transfer heat from warmer air outside of the nozzle. Exemplary thermal fan/compressor s 600 can include one or more thermal fan/compressor nozzles 602 according to this or any other suitable design.

Thermal fan/compressor nozzles may be made of any material that is chemically and thermally compatible with fluid purification processes, such as desalination. Certain embodiments are suitable for use with 450,000 ppm TDS water, more typically 100,000 ppm TDS or less water, under the temperature and pressure conditions under which the invention is used. Exemplary materials that can be used include polymers, such as polyetheretherketone (PEEK™), polysulfone (PSU), and polyvinylidene fluoride (PVDF). In some embodiments, the strength and thermal conductivity of nozzles 602 may be improved by including thermally-conductive metal powder in the thermal fan/compressor nozzle body.

Thermal fan/compressor 600 incorporates a plurality of thermal fan/compressor nozzles 602. The exemplary thermal fan/compressor 600 of FIG. 6 has a smaller number of larger thermal fan/compressor nozzles 602 relative to the embodiment of FIG. 7. Thermal fan/compressor 600 includes a cylindrical body 604 comprising an inlet face 606, an outlet face 608, and a wall 610 extending between the air inlet face and the air outlet face to form a condensation and heat exchange chamber 612. The air inlet face 606 includes a plurality of inlet orifices fluidly connected to the inlet ends 616 of a plurality of thermal fan/compressor nozzles 602 at the nozzle base 618. The air outflow face 608 includes a plurality of atomization apertures 620. The atomization apertures 620 allow air exiting the outlet orifices 622 of thermal fan/compressor nozzles 602 to atomize water bearing dissolved solids which is disposed along a surface of the outlet face 608.

Figure 7:
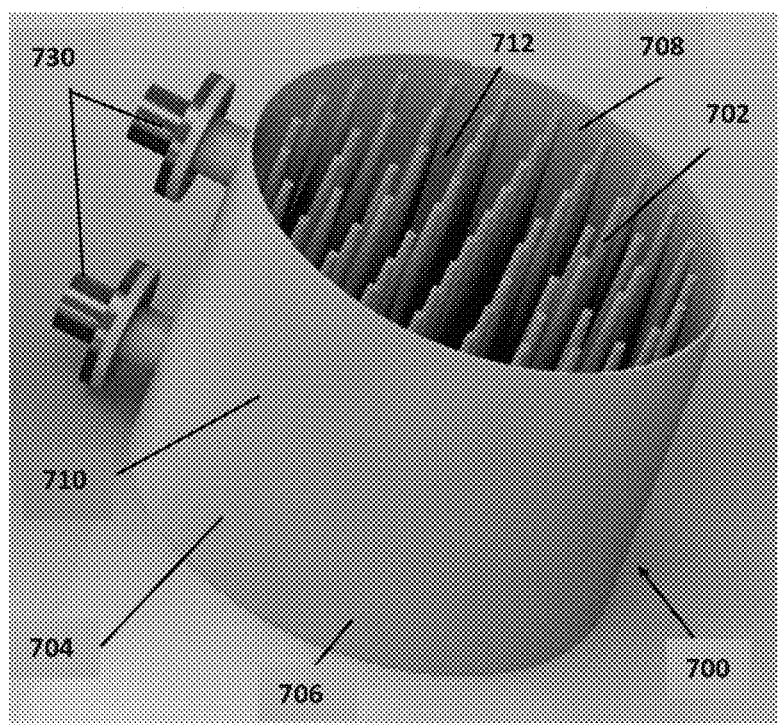
FIG. 7 is a schematic perspective view of one embodiment of a thermal fan/compressor with the top removed.

FIG. 7 shows an exemplary embodiment of a thermal fan/compressor 700 having a plurality of thermal fan/compressor nozzles 702. The thermal fan/compressor unit can have a cylindrical body 704 comprising an inlet face 706, an air outlet face 708, and a wall 710 extending between inlet face 706 and outlet face 708 to form a heat exchange and condensation chamber 712. The air inlet face 706 can include a plurality of inlet orifices connected to the inlet ends of a plurality of thermal fan/compressor nozzles 702 at the nozzle base. Outlet face 708 can include a plurality of atomization apertures as shown in FIG. 6. Atomization apertures allow air exiting outlet orifices of the thermal fan/compressor nozzles 702 to atomize a fluid, such as saline water, bearing dissolved solids, which flows along at least one surface of the outlet face 708.

As illustrated in FIGS. 6-7, the walls of the thermal fan/compressors 610, 710 may include a plurality of ports 630, 730. Ports 630, 730 enable humid air and/or water to flow into the heat exchange and condensation chamber 612, 712.

Figure 8A:
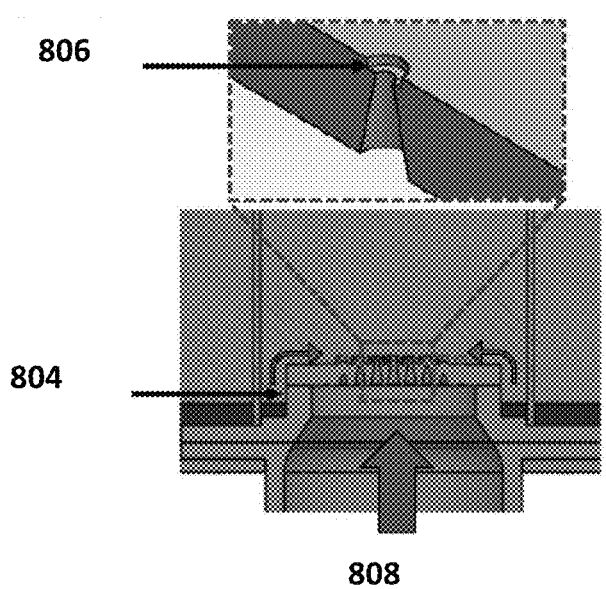
FIG. 8A is a schematic diagram of a perforated plate atomizer showing primary and secondary manifolds.
Figure 8B:
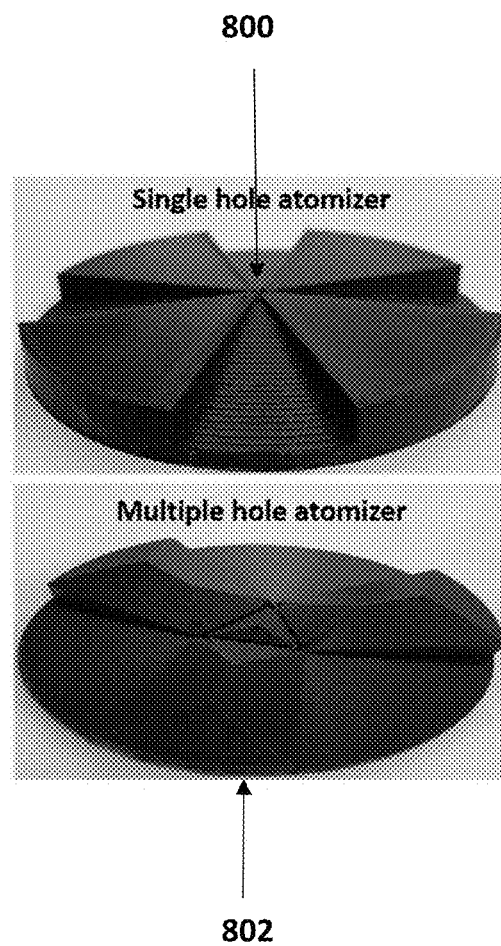
FIG. 8B illustrates exemplary embodiments of a single-hole atomizer and a multiple-hole atomizer.

FIG. 8b shows single hole atomizer 800 and multiple holes atomizer 802. This suggests that a suitable number of perforations can be incorporated into a single atomizer assembly to accommodate required mass flow rates for gas and liquid as suited for the application. Perforated plate atomizers 800 and 802 include a primary manifold 804 to ensure uniform fluid distribution, such as water distribution. Perforated plate atomizers 800 and 802 may include a secondary manifold 806 to maintain a continuous thin liquid film around perforations, such as perforations 602, through which moving gas flow 808 passes to atomize the liquid, as shown in FIG. 8a. Moving gas/air flow 808 continuously atomizes the thin liquid film and minimizes fouling that may occur with a contaminated liquid by avoiding a flow of contaminated liquid through any small passage.

In a generalized operational example, dry or low humidity air enters the thermal fan/compressor nozzles 602, 702 through inlet orifices, such as orifices 614, in a near-stagnant state with a velocity of $v_0$, near 0 m/s, and a temperature of $T_0$. Thermal energy is transferred to the heat exchange chamber 612, 712 and is conducted to the air inside the thermal fan/compressor nozzles 602, 702, accelerating the air to velocity $v_1$ greater than $v_0$ and heating it to a temperature of $T_1$ greater than $T_0$. Jets of dry air moving at velocity $v_1$ contacts incoming dissolved solids-bearing feed water at the outlet face 608, 708. The feed water is atomized by the high-velocity hot air, and the solid particles are entrained in the resulting hot, humid air.

V. EMBODIMENTS OF OTHER COMPONENTS

Described herein are examples of various other components suitable for desalination.

In one disclosed embodiment, the gas-solid separator (e.g. the cyclone) is substantially conical in shape and has an inlet at an upper end. The inlet communicates with the passageway and is located adjacent to the upper end of the cyclone. The inlet is arranged tangentially to the side wall of the cyclone such that warm, humid air entering the cyclone is directed in a helical path around the interior of the cyclone. The cyclone further includes an outlet. The outlet provides a passageway for cleaned air leaving the cyclonic separating apparatus and passing to other parts of the desalination apparatus downstream of the cyclone, such as the condensation chamber of the thermal fan/compressor or the air-water separator. A solids collector is located at the lower end of the cyclone. The solids collector collects salt and other solids rejected from the warm and humid air in the cyclone and subsequently caused to fall towards the lower end of the cyclone.

In operation, hot, humid air from a thermal fan/compressor enters the cyclone through an inlet. The airflow may follow a helical path around the interior of the cyclone. Entrained solids, such as salts, are separated from the hot, humid air by this cyclonic motion, accumulate at the lower end of the cyclone, and are collected in the solids collector. Cleaned hot, humid air that no longer contains entrained solids exits the cyclone through outlet and proceeds to downstream elements of the desalination apparatus.

VI. EXAMPLES

The following examples are provided to illustrate certain features of exemplary embodiments of the present invention. A person of ordinary skill in the art will understand that the scope of the disclosed invention is not limited to, nor defined by, these exemplary features.

Example 1

In one example of a method for the desalination of water, dry, near-stagnant ($v_0$=near 0 m/s) air enters a thermal fan/compressor such as illustrated in FIGS. 6-7. An array of thermal fan/compressor nozzles containing the near-stagnant air is externally heated by contact with hot, humid air, raising the temperature of the dry air inside the nozzles to 120° C. and accelerating it to a new velocity, $v_1$, of about 35 m/s. Dry air exits the nozzles and contacts incoming feed water having a total dissolved solids (TDS) of up to 450,000 ppm TDS, more typically 100,000 ppm or less, and a temperature of 40° C. The high-velocity hot air jets atomize the feed water, entraining solids in the humidified air stream. In this example, a humid air stream containing entrained solids has a temperature of 72° C. and a velocity of 14 m/s. The humid air stream then enters a cyclone in which solids larger than approximately 3 µm are separated from the humid air and collected. The humid air then enters the condenser/evaporator unit at T=71° C., where heat is transferred to incoming feed water and water condenses. Condensed water and air then exit the condenser/evaporator at approximately 60° C. This fresh water is directed through a heat recuperator to preheat the feed water from an intake temperature of 25° C. to a target temperature of 40° C. before being removed from the system. Additional feed water then enters the thermal fan/compressor, where it is atomized by the hot, dry air from the array of thermal fan/compressor nozzles.

Example 2

In another embodiment of a method for desalinating water, dry, near-stagnant (v=near 0 m/s) air enters a thermal fan/compressor at a temperature of approximately 30° C. and a pressure of 1 atmosphere. An array of thermal fan/compressor nozzles containing the near-stagnant air is externally heated by contact with hot, humid air, raising the temperature of the dry air inside the nozzles to 100° C. and accelerating it to a second velocity greater than the first velocity, such as about 2.6 m/s. The dry air exits the nozzles and contacts incoming feed water having a temperature of 90° C. The high-velocity jets of hot air atomize the feed water, entraining solids, such as salt(s) in the humidified air stream. The resulting humidified air stream with entrained solid particles exits the thermal fan/compressor at a velocity of 2 m/s, a temperature of 93° C., and a pressure of approximately 2 atmospheres. The humid air stream then enters a cyclone in which solids larger than approximately 3 µm are separated from the humid air and collected in a combined salt collector and heat recuperator, where intake feed water is heated to 90° C. before being introduced to the thermal fan/compressor for atomization. The substantially solids-free humid air leaves the cyclone and is heated by a heater, such as a solar heater, before flowing to the thermal fan/compressor nozzles. This causes substantially solid-free liquid, such as salt-free water, to condense as heat transfers to the air within the thermal fan/compressor nozzles.

Example 3

In another embodiment of a method for desalinating water, dry, near-stagnant (v=near 0 m/s) air enters the thermal fan/compressor at a temperature of approximately 98° C. An array of thermal fan/compressor nozzles containing the near-stagnant air is externally heated, such as by using a solar heater, to raise the temperature of the dry air inside the nozzles to 120° C. The thermal fan/compressor nozzles accelerate the heated air to a second velocity greater than the first velocity, such as velocity greater than about 19 m/s. The dry air exits the nozzles and contacts incoming hot saline feed water having a temperature of 95° C. The high-velocity hot air jets atomize the feed water, entraining solids in the humidified air stream. The humidified air is further heated by heat of condensation that is supplied by contacting the interior surface of a condenser. The resulting humidified air stream with entrained solid particles, such as salt particles, exits the thermal fan/compressor at a velocity of about 12 m/s and a temperature of about 108° C. The humid air stream then enters a cyclone in which solids larger than approximately 3 µm are separated from the humid air. Substantially particle-free humid air exits the cyclone at about 107° C. and is reintroduced to the outside surface of the condenser, where water condenses, and excess heat is transferred to the flow of atomized feed water. The hot, condensed fresh water then flows to an air-water separator. Remaining air is removed and reintroduced to the thermal fan/compressor nozzles. Fresh water then enters a heat recuperator, where heat is transferred to intake fluid, such as saline water, to heat it to a target temperature of 95° C. prior to atomization.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A thermal fan/compressor, comprising:
   an inlet face having a plurality of inlet ports;
   a plurality of nozzles configured to receive a gas from the inlet ports, each nozzle comprising a heat exchange wall, an inlet orifice having a first size, and an outlet orifice having a second size smaller than the first size of the inlet orifice;
   an outlet face having at least one atomization aperture across which a fluid can flow and be contacted by gas exiting the nozzles; and
   a wall separating the inlet face from the outlet face and forming a condensation and heat exchange chamber in which the plurality of nozzles is disposed.

2. The thermal fan/compressor according to claim 1 wherein the nozzles are conical and/or tapered such that a diameter of the inlet orifice is greater than a diameter of the outlet orifice to establish a fluid velocity at the outlet orifice, $v_1$, that is greater than fluid velocity at the inlet orifice, $v_0$.

3. The thermal fan/compressor according to claim 1 wherein the nozzles are made from a polymeric material selected from polyetheretherketone (PEEK™), polysulfone (PSU), or polyvinylidene fluoride (PVDF).

4. The thermal fan/compressor according to claim 3 wherein the nozzles comprise a thermally-conductive metal powder selected to improve the strength and/or thermal conductivity of the nozzles.

5. The thermal fan/compressor according to claim 1 wherein the outflow face includes at least one atomization aperture configured to allow gas exiting the outlet orifices of the nozzles to flow through the at least one atomization aperture.

6. The thermal fan/compressor according to claim 1 wherein the outflow face includes plural atomization apertures configured to allow gas exiting the outlet orifices of the nozzles to flow through the plural atomization apertures.

7. The thermal fan/compressor according to claim 6 wherein gas exiting the outlet orifices of the nozzles and passing through the at least one atomization aperture atomizes a fluid flowing along a surface of the outlet face.

8. The thermal fan/compressor according to claim 7 wherein gas exiting the outlet orifices of the nozzles is air, and the fluid flowing along the surface of the outlet face is contaminated water.

9. The thermal fan/compressor according to claim 1 wherein the wall defines a cylindrical housing and includes a plurality of ports configured to introduce humid air and contaminated water having entrained solids into thermal fan/compressor.

10. The thermal fan/compressor according to claim 5, further comprising:
a primary manifold configured to provide uniform fluid distribution to the at least one atomization aperture;
a secondary manifold to maintain a continuous thin liquid film around the atomization aperture or apertures to facilitate continuously atomizing the thin liquid film; or
both the primary and the secondary manifolds.

11. The thermal fan/compressor according to claim 1 further comprising a heater to heat a fluid receive by the thermal fan/compressor.

12. The thermal fan/compressor according to claim 11 wherein the heater is a solar heater.

13. The thermal fan/compressor according to claim 1, wherein:
dry or low humidity air enters the plurality of nozzles through inlet orifices with a velocity $v_0$ near 0 m/s, and an initial temperature of $T_0$;
thermal energy is transferred to the heat exchange chamber and is conducted to fluid inside the thermal fan/compressor nozzles, thereby accelerating the fluid to a velocity $v_1$ greater than $v_0$, and heating the fluid to a temperature $T_1$ greater than $T_0$; and
jets of dry fluid moving at velocity $v_1$ contact a dissolved solids-bearing feed fluid at the outlet face, whereby the solids-bearing feed fluid is atomized by high-velocity jets of dry fluid, and solid particles of the solids-bearing feed fluid are entrained in the resulting hot fluid.

14. A thermal fan/compressor, comprising:
an inlet face having a plurality of inlet ports;
a plurality of nozzles associated with and configured to receive a gas from the inlet ports, each nozzle comprising a heat exchange wall, an inlet orifice having a first size, and an outlet orifice having a second size smaller than the first size of the inlet orifice, the nozzles being tapered such that a diameter of the inlet orifice is greater than a diameter of the outlet orifice to establish a fluid velocity at the outlet orifice, $v_1$, that is greater than fluid velocity at the inlet orifice, $v_0$;
an outlet face having plural atomization apertures across which a fluid can flow and be contacted by gas exiting the nozzles, thereby atomizing the fluid flowing across the apertures; and
a wall separating the inlet face from the outlet face and forming a housing to house a condensation and heat exchange chamber in which the plurality of nozzles are disposed, the wall comprising a plurality of ports configured to allow fluids to flow into the heat exchange and condensation chamber.

15. The thermal fan/compressor according to claim 14, further comprising:
a primary manifold configured to provide uniform fluid distribution to the at least one atomization aperture; maintain
a secondary manifold configured to provide a thin liquid film to flow over the atomization aperture or apertures to facilitate continuously atomizing the thin liquid film; or
both a primary and a secondary manifold.

16. The thermal fan/compressor according to claim 14, wherein:
dry or low humid air enters the plurality of nozzles through inlet orifices with a velocity $v_0$ near 0 m/s, and an initial temperature of $T_0$;
thermal energy is transferred to the heat exchange chamber and is conducted to fluid inside the thermal fan/compressor nozzles, thereby accelerating the fluid to a velocity $v_1$ greater than $v_0$, and heating the fluid to a temperature $T_1$ greater than $T_0$; and
jets of dry air moving at velocity $v_1$ contact water comprising dissolved solids, whereby the water is atomized by high-velocity jets of dry fluid, and solid particles are entrained in the resulting hot fluid.

17. A thermal fan/compressor for use in a system for purifying contaminated water comprising entrained solids, comprising:
an inlet face having a plurality of inlet ports;
a plurality of nozzles associated with and configured to receive dry air from the inlet ports, each nozzle comprising a heat exchange wall, an inlet orifice having a first size, and an outlet orifice having a second size smaller than the first size of the inlet orifice, the nozzles being tapered such that a diameter of the inlet orifice is greater than a diameter of the outlet orifice to establish an air velocity at the outlet orifice, $v_1$, that is greater than an air velocity at the inlet orifice, $v_0$;
an outlet face having plural atomization apertures across which contaminated water can flow and be contacted by air exiting the nozzles, thereby atomizing the contaminated water flowing across the apertures; and
a wall separating the inlet face from the outlet face and forming a housing to house a condensation and heat exchange chamber in which the plurality of nozzles are disposed, the wall comprising a plurality of ports configured to allow air and contaminated water to flow into the system.

18. The thermal fan/compressor according to claim 17, further comprising:
a primary manifold configured to provide uniform fluid distribution to the at least one atomization aperture; maintain
a secondary manifold configured to provide a thin liquid film to flow over the atomization aperture or apertures to facilitate continuously atomizing the thin liquid film; or
both a primary and a secondary manifold.

* * * * *